United States Patent [19]

Flanigen et al.

[11] 4,129,450

[45] Dec. 12, 1978

[54] ACETYLENE VESSEL FILLER COMPOSITION

[75] Inventors: Edith M. Flanigen, White Plains; Brent M. Lok, Spring Valley; Norbert R. Mumbach, East Concord, all of N.Y.

[73] Assignee: Union Carbide Corporation, New York, N.Y.

[21] Appl. No.: 849,896

[22] Filed: Nov. 9, 1977

[51] Int. Cl.$^2$ .............................................. C04B 7/34
[52] U.S. Cl. .................................................. 106/120
[58] Field of Search ....................... 106/118, 119, 120; 206/0.6, 0.7

[56] References Cited

U.S. PATENT DOCUMENTS

| | | | |
|---|---|---|---|
| 3,406,030 | 10/1968 | Perraudin et al. | 106/119 |
| 3,501,324 | 3/1970 | Kubo | 106/120 |
| 3,539,364 | 11/1970 | Haddeland | 106/120 |

*Primary Examiner*—James Poer
*Attorney, Agent, or Firm*—Steven J. Hultquist

[57] ABSTRACT

An aqueous slurry composition which is curable at saturated steam pressure and temperature of 360° to 400° F to form a hard porous mass suitable for containing dissolved acetylene gas solutions, comprising lime, crystalline silica, and a thickening agent selected from the group consisting of (a) polyethylene oxide, (b) amorphous glassy silica, (c) a soluble salt of phosphate and a soluble salt of calcium and (d) a soluble salt of phosphate and a neutralizing acid.

12 Claims, No Drawings

ACETYLENE VESSEL FILLER COMPOSITION

BACKGROUND OF THE INVENTION

1. Field of the Invention

This invention relates to the use of thickening agents in acetylene vessel filler compositions.

2. Description of the Prior Art

In conventional practice, acetylene gas is commonly stored in the form of a dissolved acetylene gas solution, as for example in acetone solvent, in a vessel containing a cured, hardened porous mass of calcium silicate. Typically, the porous mass of calcium silicate filler material is formed from a mixture of crystalline sand or silica and quicklime (calcium oxide) dispersed in water to form a aqueous slurry. The aqueous slurry composition is then reacted at high temperature and saturated steam pressure to form the cured, hardened porous mass of calcium silicate.

In prior art practice, a variety of thickening agents have been employed in the preparation of the calcium silicate porous mass. Introduced into the aqueous slurry composition, these thickening agents function to prevent settling of the slurry composition, and thereby prevent an excessive amount of water from separating from the slurry composition which in turn would otherwise lead to non-uniformity in density of the product composition and to deleterious excessive clearance between the cured, hardened porous mass of calcium silicate and the walls of the acetylene vessel in which the filler is employed.

Although a large number of inorganic and organic thickening agents are known in the art of making porous masses of calcium silicate for such uses as acetylene vessel fillers and insulation media, all such thickening agents have associated shortcomings. Examples of such thickening agents include fresh aluminum, magnesium hydroxides, aluminum sulfate, sodium carbonate with a trace of sulfate, sodium aluminate, basic magnesium carbonate, phosphoric acid or a phosphate material, boric acid or a borate material, certain clays, sugar and water soluble ethyl hydroxyethyl cellulose. Most of these materials are relatively expensive. In addition, some of the afore-mentioned thickening agents, as for example, small amounts of aluminum compounds, can exhibit the growth of xonotlite crystalline phase, and larger amounts of aluminum compounds can inhibit the growth of both xonotlite and tobermorite crystalline phases in the product calcium silicate filler mass. High fractions of xonotlite and/or tobermorite crystalline phases in the calcium silicate product are preferred, since these crystalline phases provide a higher strength filler than the non-crystalline, amorphous forms of calcium silicate otherwise produced. Finally, with the addition of organic thickening agents such as sugar and ethyl hydroxyethyl cellulose to the aqueous slurry composition which is cured to form the porous calcium silicate product, a significant reduction in filler strength is generally observed.

Accordingly, it is an object of the present invention to provide a relatively inexpensive thickening agent for the aqueous slurry composition which is cured to form the porous mass of calcium silicate.

It is another object of the invention to provide such a thickening agent which is in no way deterimental to the manufacturing process of the calcium silicate product or the physical properties thereof. Other objects and advantages will be apparent from the ensuing disclosure and appended claims.

SUMMARY OF THE INVENTION

In one aspect, the invention relates to an aqueous slurry composition which is curable at saturated steam pressure and temperature of 360° to 400° F. to form a hard porous mass suitable for containing dissolved acetylene gas solutions, comprising lime, crystalline silica, and a thickening agent selected from the group consisting of (a) polyethylene oxide, (b) amorphous glassy silica, (c) a soluble salt of phosphate and a soluble salt of calcium and (d) a soluble salt of phosphate and a neutralizing acid.

In another aspect, the invention relates to a method of forming an acetylene vessel filler, comprising the steps of admixing water and a soluble phosphate salt with lime such that the weight ratio of phosphate ion in the phosphate salt to lime is 0.5 to 10% and the water is in a stoichiometric amount for slaking of the lime. Crystalline silica, additional water and a soluble salt of calcium are mixed with the slaked lime admixture to form an aqueous slurry wherein the weight ratio of phosphate ion in the phosphate salt to the calcium ion in the calcium salt is from 1.0 to 1.6, the lime-to-silica weight ratio is 0.6 to 1.0 and the water-to-solid volume ratio is 88–96%. The aqueous slurry is cured at saturated steam pressure and temperature of 360° to 400° F. to form a hard porous mass as the filler.

In yet another aspect, the invention relates to a method of forming an acetylene vessel filler, comprising the steps of admixing water and a soluble phosphate salt with lime such that the weight ratio of phosphate ion in the phosphate salt to lime is 0.5 to 10% and the water is in a stoichiometric amount for slaking of lime. Crystalline silica, additional water and a neutralizing acid are mixed with the slaked lime admixture to form an aqueous slurry wherein the neutralizing acid is present in sufficient quantity to provide 2.5–3.5 equivalents of hydrogen ion per mole equivalent of phosphate ion in the phosphate salt, the lime-to-silica weight ratio is 0.6 to 1.0 and the water-to-solid volume ratio is 88–96%. The aqueous slurry is cured at saturated stream pressure and temperature of 360° to 400° F. to form a hard porous mass as the filler.

DESCRIPTION OF THE PREFERRED EMBODIMENTS

In the conventional manufacture of calcium silicate acetylene vessel fillers, an aqueous slurry composition is formed of quicklime (calcium oxide), crystalline silica ($SiO_2$) and a reinforcing fiber such as asbestos, if desired. Typically, the quicklime is slaked in a fractional portion of the total water, as for example 50 to 70%, such that the calcium oxide undergoes chemical reaction to form calcium hydroxide and the asbestos reinforcing fiber, if employed, is dispersed in the remainder of the water. The purpose of the asbestos predispersion step is to induce separation of the agglomerative asbestos mass and provide a fine dispersion of asbestos in the aqueous medium. Next, the silica and the predispersed asbestos are added to the slaked lime. Stirring is then carried out to insure the homogeneity of the aqueous slurry composition. The slurry is then filled into an acetylene vessel and cured under high temperature conditions and saturated vapor pressure of water to form the porous filler mass of calcium silicate reinforced with asbestos.

The aqueous slurry composition of the present invention is made up in the aforedescribed manner, either with or without reinforcing fiber, with a thickening agent selected from the group consisting of (a) polyethylene oxide, (b) amorphous glassy silica, (c) a soluble salt of phosphate and a soluble salt of calcium and (d) a soluble salt of phosphate and a neutralizing acid. In the broad practice of the present invention, the aqueous slurry composition should have a lime to-silica weight ratio of 0.6 to 1.0 and preferably 0.8 to 1.0 and a water-to-solid volume ratio of 88–96%. The lime-to-silica weight ratio should desirably be in the range of 0.6 to 1.0 and preferably 0.8 to 1.0 based on stoichiometric considerations, to produce the maximum amount of calcium silicate from the lime and silica reactant materials. The water-to-solid volume ratio should not be less than 88% in order to produce a final product calcium silicate filler of adequate porosity. The water-to-solid volume ratio should not be above 96%, to obtain adequate strength in the product calcium silicate filler.

As used herein, "soluble salt" means a water soluble salt of the particular cationic or anionic species considered. The term "neutralizing acid" refers to an acid which chemically reacts with metal hydroxide by neutralization reaction to form a metal salt and water.

When the thickening agent employed in the practice of the present invention consists of polyethylene oxide or amorphous glassy silica, the thickening agent may suitably be added to the slaked lime in the acetylene vessel filler manufacturing process. When a soluble salt of phosphate and a soluble salt of calcium or, alternatively, a soluble salt of phosphate and a neutralizing acid are employed as the thickening agent in accordance with the present invention, the procedure for forming the acetylene vessel filler is as follows. Water and a soluble phosphate salt are admixed with lime such that the weight ratio of phosphate ion in the phosphate salt to lime is 0.5 to 10% and the water is in a stoichiometric amount for slaking of the lime. Crystalline silica, additional water and the calcium salt or the neutralizing acid are added to the slaked lime admixture to form an aqueous slurry. Based on stoichimetric considerations, when a soluble salt of calcium is employed as the thickening agent in combination with a soluble salt of phosphate, the weight ratio of phosphate ion in the phosphate salt to the calcium ion in the calcium salt should be in the range of from 1.0 to 1.6. When a neutralizing acid is employed as the thickening agent in combination with a soluble salt of phosphate, the neutralizing acid should be present in sufficient quantity to provide 2.5 to 3.5 equivalents of hydrogen ion per mole equivalent of phosphate ion in the phosphate salt. The aqueous slurry is then cured at saturated steam pressure and temperature of 360° to 400° F. and preferably 385° to 400° to form a hard porous mass as the filler. As indicated, the aqueous slurry composition may further comprise a reinforcing fiber, such that the acetylene vessel filler product is reinforced with such fibers.

The method described above wherein the thickening agent is a soluble salt of phosphate and a soluble salt of calcium or, alternatively, a soluble salt of phosphate and a neutralizing acid produces a filler comprising a cured, hardened porous mass of calcium silicate of at least 50% xonotlite crystalline phase and 1–20% calcium phosphate. Such composition has been found to be associated with superior strength characteristics of the product filler as well as with relatively short curing times at high temperature and saturated steam pressure to form the product filler from the aqueous slurry mixture.

The thickening agents employed in the practice of the present invention provide a low level of water separation in the aqueous slurry composition, high porosity, as for example greater than 90% porosity, in the calcium silicate porous mass, low bulk density in the calcium silicate porous mass and a low level of void spaces in the calcium silicate filler product due to a correspondingly low level of water separation in the aqueous slurry composition. Such high porosity fillers as are obtained in the practice of the present invention are advantageous inasmuch as they entail a high loading capacity for the dissolved acetylene gas solution in the acetylene vessel filler.

As a general proposition in the manufacture of acetylene vessel fillers, the addition of thickening agents in the manufacturing process should not significantly decrease the strength of the product filler material. The thickening agents of the present invention do not result in any significant decrease in filler strength. As an example, in the practice of the present invention wherein the thickening agent is a soluble salt of phosphate together with a soluble salt of calcium, a filler with a 96% porosity can be manufactured without appreciable amounts of water separation and with a compressive strength around 150 psi.

In the practice of the present invention wherein the thickening agent is a soluble salt of phosphate and a soluble salt of calcium, or alternatively, a soluble salt of phosphate and a neutralizing acid, the calcium silicate filler produced by the method of this invention contains at least 50% xonotlite crystalline phase and 1–20% calcium phosphate. In order to achieve optimum thickening action from such thickening agents, the phosphate salt should be added either to the dry lime or to the water before lime slaking in the aqueous slurry composition manufacture, and calcium salt or neutralizing acid should be introduced toward the end of the entire mixing process. Although we do not wish to be bound by any theory in explaining the chemical reaction mechanism attendant the use of soluble phosphate salts and either calcium salts or neutralizing acid as thickening agents, it is believed that the thickening effect of these agents derives from the presence of phosphate ions in the phosphate salt which results in the formation of colloidal calcium phosphate and also from the prevention of coagulation of calcium hydroxide. It is also believed that the presence in the aqueous slurry composition of small amounts of soluble metal hydroxide, which is the reaction product of the soluble salt of phosphate (phosphate ion) and calcium hydroxide, detrimentally affects the rate of conversion of amorphous calcium silicate or tobermorite gel (calcium silicate intermediate) to crystalline tobermorite and xonotlite during the filler curing step at elevated temperature and saturated stream pressure. The purpose of the addition of the neutralizing acid is to remove the small amount of soluble metal hydroxide from the aqueous slurry composition. The addition of soluble calcium salt or neutralizing acid to the aqueous slurry composition insures the presence of a high concentration of xonotlite crystalline phase in the product calcium silicate filler composition. As mentioned earlier herein, high amounts of xonotlite crystalline phase in the product filler composition are desirable inasmuch as they provide high strength in the product filler composition relative to amorphous calcium silicate.

In the practice of the invention wherein the thickening agent is a soluble salt of phosphate and a soluble salt of calcium, a suitable soluble salt of phosphate is sodium phosphate, as for example in the crystalline form $Na_3PO_4 \cdot 12H_2O$, and a suitable soluble salt of calcium is calcium nitrate. In the practice of the invention wherein the thickening agent is a soluble phosphate salt and a neutralizing acid, a suitable neutralizing acid is nitric acid. In the aqueous slurry composition, the weight ratio of phosphate ion in the phosphate salt to lime should desirably be in the range of 0.5 to 10%, to obtain adequate thickening behavior from the phosphate ion. For a calcium salt, the weight ratio of phosphate ion in the phosphate salt to the calcium ion in the calcium salt is desirably in the range of from 1.0 to 1.6, and for a neutralizing acid, the neutralizing acid is present in sufficient quantity to provide 2.5–3.5 equivalents of hydrogen ion per mole equivalent based on stoichimetric considerations, to provide removal of metal hydroxide in the aqueous slurry composition which is formed by chemical reaction between calcium hydroxide and the phosphate salt.

In the practice of the present invention wherein the thickening agent is polyethylene oxide, the concentration of polyethylene oxide in the aqueous slurry composition is preferably from 0.5 to 5.0 weight percent of the solids weight of the composition to provide adequate thickening behavior. In the practice of the invention wherein the thickening agent is amorphous glassy silica, the concentration of amorphous glassy silica in the aqueous slurry composition is preferably from 5 to 25% of the weight solids of the composition to provide adequate thickening behavior.

The advantages of the present invention will be shown more fully by the examples set forth hereinbelow.

EXAMPLE I

In this Example, a calcium silicate filler was made using amorphous glassy silica as a thickening agent. An aqueous slurry was made of the following composition:

| | | |
|---|---|---|
| Quicklime | Percent by Weight | 41.0 |
| Crystalline Silica (Quartz Flour) | Percent by Weight | 43.9 |
| Amorphous Glassy Silica | Percent by Weight | 5.0 |
| Water | Lbs. per lb. of Lime | 8.7 |
| Abestos | Percent by Weight | 10.0 |

The respective proportions of lime to silica (quartz flour plus amorphous glassy silica) were such that the weight ratio was 0.84 and of amorphous glassy silica to crystalline silica were such that the weight ratio was 0.11.

The lime was slaked with 560 ml of water for an hour then predispersed asbestos was added to the slaked lime and further stirred for 30 minutes. Finally, the silica was introduced and stirred for an additional 15 minutes. The aqueous slurry was then cured at saturated steam pressure in an autoclave; autoclave temperature was set at 385° F. and the autoclave time used was 16 hours. Subsequently, baking was done at 625° F. The suspension was found good.

The physical properties of the resulting porous mass are listed below:

| Crystalline composition from X-ray diffraction (%) | |
|---|---|
| Xonotlite | 64 |
| Tobermorite | 13 |
| Amorphous | 13 |
| Asbestos | 10 |
| Quartz | 0 |
| Shrinkage | 0.015% |
| Strength, Compressive | 317 psi |
| Flexural | 425 psi |
| Viscosity | 11,200 cp |
| Settling Property | creamy and thick, no settling |

EXAMPLE II

In this Example, a calcium silicate filler was made using a soluble salt of phosphate and a soluble salt of calcium as the thickening agent. An aqueous slurry was made up of the following composition:

| | | |
|---|---|---|
| Quicklime | Percent by Weight | 41.8 |
| Crystalline Silica (quartz flour) | Percent by Weight | 46.4 |
| Asbestos | Percent by Weight | 8.8 |
| Water | Lbs. per lb. of Lime | 8.1 |
| $Na_3PO_4 \cdot 12 H_2O$ | Percent by Weight | 1.7 |
| $CaCl_2$ | Percent by Weight | 1.3 |

The respective proportions of lime to silica were such that the weight ratio was 0.90.

The sodium phosphate (dry) was added to the dry lime before slaking. The lime was then slaked in a fractional portion of the water. Asbestos was predispersed in the remainder of the water and then added to the slaked lime together with silica. Lastly, calcium chloride was added to the mix. The suspension properties of the mix were very good.

The mix was autoclaved at 385° F. for 19 hours under saturated steam vapor pressure. Baking was done at 600° F.

The physical properties of the filler are listed below:

| Crystalline composition from x-ray diffraction (%) | |
|---|---|
| Xonotlite | 74 |
| Tobermorite | 4 |
| Amorphous | 14 |
| Asbestos | 8 |
| Quartz | 0 |
| Shrinkage | −0.27 g/cc |
| Bulk Density | 0.27 g/cc |
| True Density | 2.75 g/cc |
| Porosity | 90.11% |
| Strength, Compressive | 496 psi |
| Flexural | 384 psi |
| Water Separation of Mix | No settling after 24 hours |

EXAMPLE III

In this Example, a calcium silicate filler was made using only a soluble salt of phosphate as the thickening agent. An aqueous slurry was made up of the following composition:

| | | |
|---|---|---|
| Quicklime | Percent by Weight | 42.3 |
| Crystalline Silica (quartz flour) | Percent by Weight | 47.0 |
| Asbestos | Percent by Weight | 8.9 |
| Water | Lbs. per lb. of Lime | 8.1 |
| $Na_3PO_4 \cdot 12 H_2O$ | Percent by Weight | 1.7 |

The respective proportions of lime to silica were such that the weight ratio was 0.90.

The preparation procedure was the same as Example II, except CaCl₂ was not added in this case.

The physical properties of the cured filler are listed below.

| Crystalline composition from X-ray diffraction (%) | |
|---|---|
| Xonotlite | 8 |
| Tobermorite | 10 |
| Amorphous | 72 |
| Asbestos | 10 |
| Quartz | 0 |
| Water Separation | No settling after 24 hours |

The mass shrunk excessively after drying at 230° F. for 2 hours due to the high amorphous content. This Example illustrates the slower crystallization rate with phosphate ion alone added as thickening agent. Comparison of this Example with Example II shows the benefit of the addition of the combined phosphate/calcium ion thickening agent.

EXAMPLE IV

In this Example, a calcium silicate filler was made using polyethylene oxide as the thickening agent. An aqueous slurry was made up of the following composition:

| Quicklime | Percent by Weight | 40.4 |
|---|---|---|
| Crystalline Silica (quartz flour) | Percent by Weight | 48.1 |
| Polyethylene Oxide | Percent by Weight | 1.8 |
| Water | Lbs. per lb. of Lime | 8.7 |
| Asbestos | Percent by Weight | 9.8 |

The respective proportions of lime to silica were such that the weight ratio was 0.84.

The preparation procedures are the same as stated in Example 1, except that polyethylene oxide was added to the slaked lime along with predispersed asbestos. The suspension property of the mix was found to be good.

The physical properties of the cured filler are listed below:

| Crystalline composition from X-ray diffraction (%) | |
|---|---|
| Xonotlite | 60 |
| Tobermorite | 13 |
| Amorphous | 14 |
| Asbestos | 12 |
| Quartz | 1 |
| Shrinkage | 0.005% |
| Strength, Compressive | 248 psi |
| Flexural | 338 psi |
| Water settling of Mix | No settling overnight, thick and creamy |

EXAMPLE V

In this Example, a calcium silicate filler was made using a soluble salt of phosphate, sodium phosphate, and a soluble salt of calcium, calcium nitrate, as the thickening agent. An aqueous slurry was made up of the following composition:

| Quickline | Percent by Weight | 45.6 |
|---|---|---|
| Crystalline Silica (quartz flour) | Percent by Weight | 50.7 |
| Water | Lbs. per lb. of lime | 8.1 |
| Na₃PO₄ . 12H₂O | Percent by Weight | 1.8 |
| Ca(NO₃)₂ . 4H₂O | Percent by Weight | 1.9 |

The respective proportions of lime to silica were such that the weight ratio was 0.90.

The preparation procedure was the same as in Example II, except that the autoclave time was 20 hours.

The physical properties of the filler are listed below:

| | difraction (%) |
|---|---|
| Xonotlite | 81 |
| Tobermorite | 7 |
| Amorphous | 12 |
| Quartz | trace |

EXAMPLE VI

In this Example, a calcium silicate filler was made using a soluble salt of phosphate and a neutralizing acid as the thickening agent. An aqueous slurry was made up of the following composition:

| Quicklime | Percent by Weight | 45.9 |
|---|---|---|
| Crystalline Silica (quartz flour) | Percent by Weight | 51.0 |
| Water | Lbs. per lb. of Lime | 8.1 |
| Na₃PO₄ . 12H₂O | Percent by Weight | 1.8 |
| HNO₃(69%) | Percent by Weight | 1.3 |

The respective proportions of lime to silica were such that the weight ratio was 0.90.

The preparation procedure was as follows:

The sodium phosphate (dry) was added to the dry lime before slaking. The lime was then slaked by addition of water and silica was added to the admixture. Finally, the nitric acid was added to the mix.

The mix was autoclaved at 385° F. for 20 hours under saturated steam vapor pressure. The resulting filler was then dried overnight at 100° C.

The physical properties of the filler are listed below:

| Crystalline composition from x-ray diffraction (%) | |
|---|---|
| Xonotlite | 69 |
| Tobermorite | 18 |
| Amorphous | 14 |
| Quartz | trace |

Although preferred embodiments have been described in detail, it will be appreciated that other embodiments are contemplated only with modifications of the disclosed features, as being within the scope of the invention. For example, although the calcium silicate product of the present invention has been described herein as an acetylene vessel filler material, it will be apparent that the utility of the calcium silicate product is not so limited, but rather extends to all applications in which calcium silicate porous masses may usefully be employed, such as insulation applications.

What is claimed is:

1. An aqueous slurry composition which is curable at saturated steam pressure and temperature of 360° to 400° F. to form a hard porous mass suitable for containing dissolved acetylene gas solutions, comprising lime, crystalline silica, and a thickening agent selected from the group consisting of (a) polyethylene oxide, (b) a soluble salt of phosphate and a soluble salt of calcium, and (c) a soluble salt of phosphate and a neutralizing acid.

2. A composition according to claim 1 wherein the lime-to-silica weight ratio is 0.6 to 1.0, and the water-to-solid volume ratio is 88–96%.

3. A composition according to claim 1 further comprising reinforcing fiber.

4. A composition according to claim 1 wherein said thickening agent is a soluble salt of phosphate and a soluble salt of calcium, wherein said soluble salt of phosphate is sodium phosphate and said soluble salt of calcium is calcium nitrate.

5. A composition according to claim 1 wherein said thickening agent is a soluble salt of phosphate and a soluble salt of calcium, wherein the weight ratio of phosphate ion in the phosphate salt to lime is 0.5 to 10%.

6. A composition according to claim 5 wherein the weight ratio of phosphate ion in the phosphate salt to the calcium ion in the calcium salt is from 1.0 to 1.6.

7. A composition according to claim 1 wherein said thickening agent is polyethylene oxide and the concentration of polyethylene oxide in said composition is from 0.5 to 5.0 weight percent of the solids weight of said composition.

8. A composition according to claim 1 wherein the thickening agent is a soluble salt of phosphate and a neutralizing acid, wherein said soluble salt of phosphate is sodium phosphate and said neutralizing acid is nitric acid.

9. A composition according to claim 1 wherein the thickening agent is a soluble salt of phosphate and a neutralizing acid, wherein the weight ratio of phosphate ion in the phosphate salt to lime is 0.5 to 10%.

10. A composition according to claim 9 wherein the neutralizing acid is present in sufficient quantity to provide 2.5–3.5 equivalents of hydrogen ion per mole equivalent of phosphate ion in the phosphate salt.

11. A method of forming a hard porous mass suitable for containing dissolved acetylene gas solutions, comprising the steps of:
 (a) admixing water and a soluble phosphate salt with lime such that the weight ratio of phosphate ion in the phosphate salt to lime is 0.5 to 10 percent and the water is in a stoichiometric amount for slaking of the lime;
 (b) mixing crystalline silica, additional water and a soluble salt of calcium to the slaked lime admixture of step (a) to form an aqueous slurry wherein the weight ratio of phosphate ion in the phosphate salt to the calcium ion in the calcium salt is from 1.0 to 1.6, the lime-to-silica weight ratio is 0.6 to 1.0 and the water-to-solid volume ratio is 88–96%; and
 (c) curing the aqueous slurry at saturated steam pressure and temperature of 360° to 400° F. to form said hard porous mass.

12. A method of forming a hard porous mass suitable for containing dissolved acetylene gas solutions, comprising the steps of:
 (a) admixing water and a soluble phosphate salt with lime such that the weight ratio of phosphate ion in the phosphate salt to lime is 0.5 to 10 percent and the water is a stoichiometric amount for slaking of the lime;
 (b) mixing crystalline silica, additional water and a neutralizing acid to the slaked lime admixture of step a to form an aqueous slurry wherein the neutralizing acid is present in sufficient quantity to provide 2.5–3.5 equivalents to hydrogen ion per mole equivalent of phosphate ion in the phosphate salt, the lime-silica weight ratio is 0.6 to 1.0 and the water-to-solid volume ratio is 88–96%; and
 (c) curing the aqueous slurry at saturated steam pressure and temperature to 360° to 400° F. to form said hard porous mass.

* * * * *